Feb. 26, 1952 R. J. MAUCK 2,587,354
RAIN TROUGH FOR VEHICLE WINDOWS
Filed April 5, 1948 2 SHEETS—SHEET 2
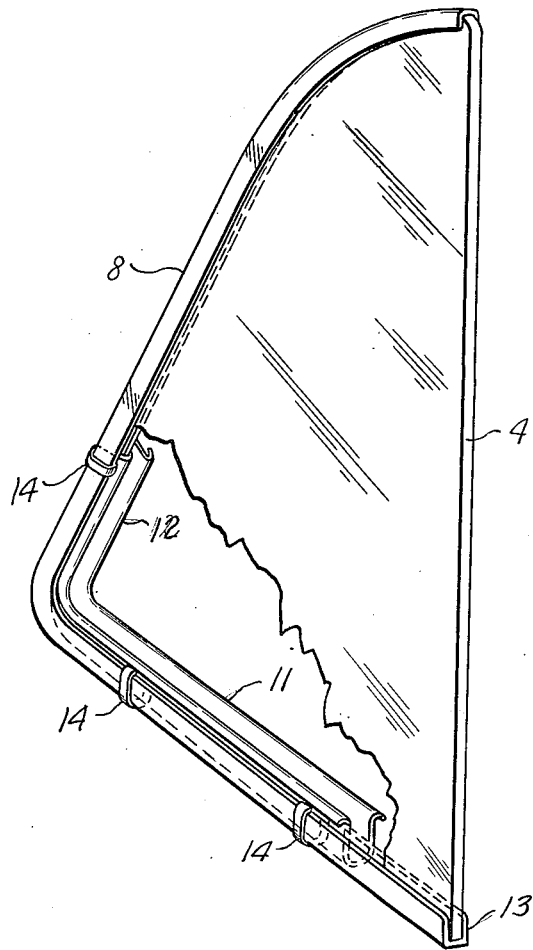
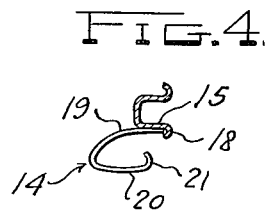
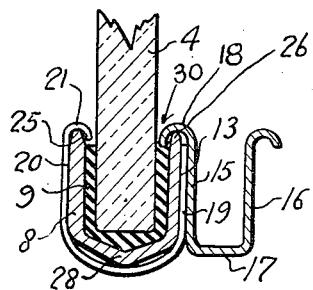
INVENTOR.
Robert J. Mauck
BY
Barnes, Kisselle, Laughlin & Raisch
ATTORNEYS Patented Feb. 26, 1952

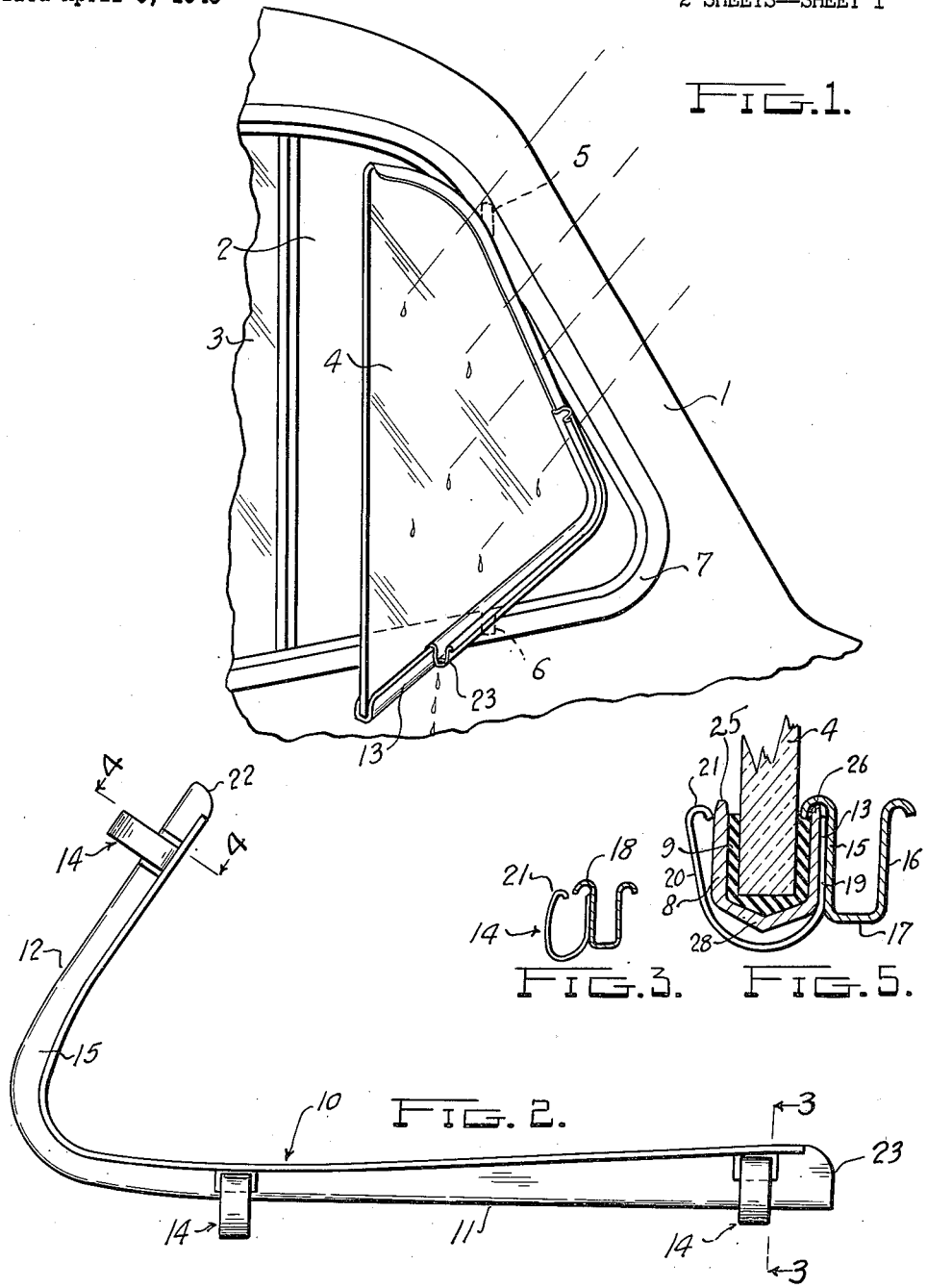

2,587,354

UNITED STATES PATENT OFFICE 2,587,354

RAIN TROUGH FOR VEHICLE WINDOWS

Robert J. Mauck, Detroit, Mich.

Application April 5, 1948, Serial No. 18,932

8 Claims. (Cl. 296—44)

This invention relates to a rain trough for an automotive vehicle ventilating window.

The Fisher Patent 2,048,605 discloses a ventilating automobile window panel which swings about a vertical, that is, an up and down axis, so that the portion of the panel forward of the axis swings inwardly of the vehicle body and the portion to the rear of the axis swings outwardly of the vehicle body. With this type of ventilating window panel, when open, the air in many cases travels through the portion of the window opening forward of the axis inwardly of the body and draws in with it rain which strikes the portion of the window panel forwardly of the axis and then runs down upon the inside trimming or falls upon the passenger seated on the seat adjacent to the window.

It is the object of this invention to remedy this disadvantage of such ventilating window and to accomplish this end I have provided a rain trough of channel section which extends along the lower edge of the window and upwardly along the inner vertical edge of the window so that the rain which impinges against the portion of the window panel within the body runs into the trough and is discharged from the outer end of the trough to the outside of the vehicle body.

Fig. 1 is an elevation showing my trough mounted on an automotive vehicle pivoted window panel.

Fig. 2 is a side elevation of my trough.

Figs. 3 and 4 are sections along the lines 3—3 and 4—4 of Fig. 2.

Fig. 5 is a view showing the rain trough in the act of being installed upon the window panel.

Fig. 6 is a perspective from the inside of the window panel showing the rain trough mounted thereon.

Fig. 7 is a transverse cross section through the panel, window frame, and trough assembly.

Referring more particularly to the drawings, there is shown an automobile body 1 having a window opening 2 which is arranged to be closed by a rear sliding panel 3, a front swinging panel 4 pivoted to swing about a vertical or up and down axis upon pintles 5 and 6 journalled in the frame 7 of the window opening—all as described in the Fisher Patent 2,048,605.

Window glass 4 is provided with a metal frame 8 which extends along its front and bottom edges. A suitable weatherstrip 9, cork, rubber or other material, is positioned between the outer edge of the glass 4 and the frame 8 and serves both to seal and cushion the glass 4 in the frame 8.

My rain trough is generally designated 10 and comprises a channel member of metal, plastic, or other suitable material, having a horizontal portion 11 and a vertical portion 12. The trough 10 is arranged for mounting upon the outside face 13 of the glass frame 8 and to this end is provided with a plurality of spring clips 14 welded or otherwise affixed to the inner side wall 15 of the trough 10. The outside wall of the trough is designated 16 and the bottom wall 17. The free edge 18 of side wall 15 of trough 10 is arcuate, that is, curved about a true radius, so that it extends outwardly from side wall 15 beyond the leg 19 of clip 14. The other leg of clip 14 is designated 20 and is provided with an inwardly turned edge 21 which is also formed about a true radius.

It will be noted that I provide three clips 14, one positioned adjacent the upper end 22 of portion 12 of trough 10, another positioned adjacent the rear end 23 of trough 10, and a third positioned along the horizontal portion of trough 10 adjacent to the junction with the upright portion 12. Preferably the clips 14 on the horizontal portion 11 of the trough should be positioned on opposite sides of pintle 6.

Referring to Figs. 3 and 4 it will be noted that clip 14 in its unstressed condition is narrower than the glass frame 13 and that the bead 21 is positioned below bead 18.

The trough 10 is mounted on the frame 8 preferably by first hooking the beaded edge 18 of trough 10 (that is, both the vertical portion 12 and the horizontal portion 11) over the outer free edge 26 of frame 8, as illustrated in Fig. 5. The spring clips 14 are then forced against the bottom or outer face 28 of frame 8 and over the free edge 25 of the inner wall of channel frame 8 so that the beaded edges 21 of clips 14 snap over the free edge 25 of frame 8, as illustrated in Figs. 6 and 7. It should be noted that the free edge of bead 18 digs or presses into seal 9, as shown at 30, Fig. 7, seal 9 being made from rubber, cork, fiber impregnated rubber composition, or any other suitable distortable or flexible weathersealing material. Thus, beaded edge 18 of trough 10 cooperates with seal 9 at 30 to provide a waterproof seal between the glass and the trough throughout the entire length of beaded edge 18 of the trough thus insuring that all of the water which flows down the outside face of the window panel 4 will flow into the trough 10 and out of the end 23 of the trough.

It should be noted that edges 25 and 26 of channel frame 8 are spaced from the inner and outer faces of glass panel 4 so that beads 18 and 21 hook over the free edges of frame 8. Therefore, when the trough is mounted upon window 4, as shown in Figs. 1, 6, and 7, it will be noted that the clips 14 are under tension because the legs 19 and 20 of the clips are spread apart and, in addition, the clips 14 tend at all times to draw the beads 18 and 21 into interengaging relation with edges 25 and 26 of the channel frame 8.

To release the trough from frame 8 one reverses the steps outlined above. First, the ends 21 of the clips are disengaged from the edge 25 of frame 8, as illustrated in Fig. 5, whereupon the beaded edge 18 of the trough can be disengaged from the outer edge 26 of the channel and the trough removed.

The trough, of course, is mounted on the window panel 4 when it is in open position. When panel 4 is closed, it will be noted that the clip 14 is clamped between the outer face 28 of frame 8 and the window frame 7 so that the trough cannot be disassembled from the panel 4. Thus, as long as the window panel 4 is closed, the trough 10 cannot be stolen. It will be noted that the rear end 23 of the trough is deeper than the forward end so that the rain which runs down the window into the trough will run from within the body outwardly beyond pivot 6 where it is discharged from the end 23 of the trough which will be located without the vehicle body.

When the trough is assembled to the window, clips 14 are under tension and the beaded edge 21 of each clip is positioned in the same plane as the beaded edge 18 of trough 10 (Fig. 7) whereas in unstressed or disassembled position (Fig. 3) it will be noted that the beaded edge 21 of each clip is offset from beaded edge 18 of the trough. Thus, when the trough is assembled to the window (Fig. 7), the clips 14, due to their stressed or tensioned condition, urge or force the beaded edge 18 of the trough into the upper edge of the seal 9 between glass 4 and wall 13 to effect a waterproof seal between the channel and the window. Thus, the water which runs down the window panel 4 from above the trough will flow into the trough and out of the car from discharge end 23 of the trough.

I claim:

1. In combination with the channel frame of a vehicle body glass panel pivoted on an up and down axis so that a portion of the frame on one side of the axis swings inwardly of the body as the portion of the panel on the other side of the axis swings outwardly of the body, weatherstripping means within said channel frame, a rain trough comprising a channel member having a substantially horizontal portion and an upright portion, said upright portion of the trough being juxtaposed to the outside face of the upright portion of the panel frame which swings inwardly of the vehicle body, said horizontal portion of the trough being juxtaposed to the outside face of the portion of the panel frame from the upright portion of the panel frame to a point on the other side of the said axis where the panel swings outwardly of the vehicle body, said trough having an edge which overhangs the outer edge of the frame and seals against the weatherstripping means within said channel frame, and resilient means on said trough arranged to detachably engage said frame for securing the said trough to said frame whereby when the window panel is open rain striking the portion of the panel inside the body is carried by the trough outwardly of the body.

2. In combination with the channel frame of a vehicle body glass panel pivoted on an up and down axis so that a portion of the frame on one side of the axis swings inwardly of the body as the portion of the panel on the other side of the axis swings outwardly of the body, a seal of flexible distortable material between the channel frame and the glass panel, a rain trough comprising a channel member juxtaposed to the outside face of the panel frame fore and aft of said axis, said trough having an edge which overhangs the outer edge of the channel frame member and seals against the sealing means within said channel, and resilient means for securing said trough to said frame, said resilient means being under tension and forcing the said edge of the trough into sealing engagement with the seal on the outside of said panel, whereby rain striking the outer face of the glass panel is carried away by the trough.

3. The combination as set forth in claim 2 wherein the resilient means comprises a plurality of generally C-shaped spring clips which are in tension and force the overhanging edge of the trough into sealing engagement with the distortable seal.

4. A rain trough adapted for mounting upon a channel-shaped frame for a ventilating automotive vehicle window panel comprising a trough of channel section having a substantially horizontal portion and an integral upright portion, said trough having one of its longitudinal edges extending in an arcuate path outwardly and downwardly of the base of said trough for hooked engagement over the upper edge of one side wall of said channel-shaped frame and a plurality of generally C-shaped resilient spring clips for mounting said trough on said frame, said clips having one leg affixed to the side wall of said channel trough having said arcuately extending edge portion, the other leg of said spring clips being adapted to resiliently engage the opposite side wall of said channel-shaped frame.

5. The combination as set forth in claim 4 wherein the end of said other leg of said C-shaped clip is turned inwardly and downwardly toward the other leg of said clip whereby when said trough is mounted on said frame the arcuate edge of said trough and the inwardly turned edge of said clip may be hooked around the upper edges of the opposite side walls of said channel-shaped frame.

6. The combination as set forth in claim 5 wherein the inwardly turned edge of said spring clip in the normally unstressed condition is positioned in a plane generally between the plane of said arcuately shaped edge portion of said trough and the plane of the bottom of said trough.

7. In combination with the channel frame of a vehicle body glass panel pivoted on an up and down axis so that a portion of the frame on one side of the axis swings inwardly of the body as the portion of the panel on the other side of the axis swings outwardly of the body, a rain trough comprising a channel member having a substantially horizontal portion and an upright portion, said upright portion of the trough being juxtaposed to the outside face of the upright portion of the panel frame which swings inwardly of the vehicle body, said horizontal portion of the trough being juxtaposed to the outside face of the portion of the panel frame from the upright portion of the panel frame to a point on the other side of the said axis where the panel swings outwardly of the vehicle body, the upper edge of the face of said channel adjacent the outer side wall of said frame being turned inwardly and downwardly of said frame for sealing engagement with said window panel, and means on said trough detachably engaging said frame for securing said trough to said frame and for maintaining said inwardly and downwardly turned edge in sealing engagement with said window panel whereby when the window panel is open rain striking the portion of the panel inside the body flows into said trough and is carried by the trough outwardly of the body.

8. In combination with the channel frame of a vehicle body glass panel pivoted on an up and down axis so that a portion of the frame on one side of the axis swings inwardly of the body as the portion of the panel on the other side of the axis swings outwardly of the body, a rain trough comprising a channel member having a substantially horizontal portion and an upright portion, said upright portion of the trough being juxtaposed to the outside face of the upright portion of the panel frame which swings inwardly of the vehicle body, said horizontal portion of the trough being juxtaposed to the outside face of the portion of the panel frame from the upright portion of the panel frame to a point on the other side of the said axis where the panel swings outwardly of the vehicle body, the upper edge of the face of said channel adjacent the outer side wall of said frame being turned inwardly and downwardly of said frame for sealing engagement with said window panel, and means for securing said trough to said frame whereby when the window panel is open rain striking the portion of the panel inside the body flows into said trough and is carried by the trough outwardly of the body, said last mentioned means comprising a plurality of C-shaped spring clips, said clips having one leg fixed to the inner face of said trough having said inwardly and downwardly turned edge, the upper edge of the other leg of said spring clip being turned inwardly and downwardly for hooked engagement over the other side wall of said frame, said last mentioned edge being positioned in the normally unstressed condition in a plane generally between the plane of said inwardly turned edge of said trough and the plane of the bottom of said trough.

ROBERT J. MAUCK.

REFERENCES CITED

The following references are of record in the file of this patent:

UNITED STATES PATENTS

| Number | Name | Date |
|---|---|---|
| 1,958,934 | Williams | May 15, 1934 |
| 2,029,979 | Andrews | Feb. 4, 1936 |
| 2,100,254 | Kridler | Nov. 23, 1937 |
| 2,119,635 | Griffith | June 7, 1938 |
| 2,263,860 | Schell | Nov. 25, 1941 |
| 2,354,443 | Schirra | July 25, 1944 |
| 2,451,399 | Martin | Oct. 12, 1948 |
| 2,500,991 | Kent | Mar. 21, 1950 |